US009904895B2

(12) United States Patent
Arthurs et al.

(10) Patent No.: US 9,904,895 B2
(45) Date of Patent: *Feb. 27, 2018

(54) COMPUTER BASED GUEST MONITORING AND IDENTIFICATION SYSTEM AND METHOD

(71) Applicant: OpenTable, Inc., San Francisco, CA (US)

(72) Inventors: David J. Arthurs, Milwaukee, WI (US); Robert M. Swafford, III, Cudahy, WI (US)

(73) Assignee: OpenTable, Inc., San Francisco, CA (US)

( * ) Notice: Subject to any disclaimer, the term of this patent is extended or adjusted under 35 U.S.C. 154(b) by 680 days.

This patent is subject to a terminal disclaimer.

(21) Appl. No.: 14/337,588

(22) Filed: Jul. 22, 2014

(65) Prior Publication Data

US 2015/0046199 A1    Feb. 12, 2015

Related U.S. Application Data

(63) Continuation of application No. 12/006,376, filed on Dec. 31, 2007, now Pat. No. 8,830,030.

(60) Provisional application No. 60/930,372, filed on May 16, 2007.

(51) Int. Cl.
*G06Q 10/02* (2012.01)
*G06Q 50/12* (2012.01)
*G06Q 10/06* (2012.01)

(52) U.S. Cl.
CPC ............. *G06Q 10/02* (2013.01); *G06Q 10/06* (2013.01); *G06Q 50/12* (2013.01)

(58) Field of Classification Search
CPC ........ G06Q 10/02; G06Q 10/06; G06Q 50/12; G06Q 20/20; G06Q 20/32; G06Q 20/327; G06Q 30/0268; G06Q 20/3278
See application file for complete search history.

(56) References Cited

U.S. PATENT DOCUMENTS

| 6,513,015 | B2 * | 1/2003 | Ogasawara | G06Q 30/02 340/643 |
|---|---|---|---|---|
| 7,047,205 | B2 * | 5/2006 | Hale | G06Q 10/02 340/4.6 |
| 7,328,166 | B1 * | 2/2008 | Geoghegan | G06Q 10/02 705/5 |
| 7,330,110 | B1 * | 2/2008 | Heintzman | G06F 9/542 340/3.1 |

(Continued)

*Primary Examiner* — Yong Hang Jiang
(74) *Attorney, Agent, or Firm* — Van Pelt, Yi & James LLP

(57) ABSTRACT

A guest monitoring and identification system is shown. The system comprises an RFID carried by a guest and includes therein programmed predetermined data identifying a guest. An activating transmitter transmits a monitoring signal over a designated area to be traversed by a guest having the RFID. A receiver receives from the RFID a transmitted data signal containing the programmed predetermined data identifying the guest. A guest identification and service information processor receives the transmitted data signal. The processor interprets the programmed predetermined data identifying a guest and generates data/information signals providing the name and service profile for an identified guest. A communication device communicates to service staff the name and service profile for an identified guest.

19 Claims, 5 Drawing Sheets

(56) References Cited

U.S. PATENT DOCUMENTS

| | | | |
|---|---|---|---|
| 2005/0080676 A1* | 4/2005 | Lovegreen | G06Q 50/12 705/15 |
| 2006/0085266 A1* | 4/2006 | Wei | G06Q 50/12 705/15 |
| 2007/0139212 A1* | 6/2007 | Kaundinya | G06Q 10/06 340/692 |

* cited by examiner

COMPUTER BASED GUEST MONITORING AND IDENTIFICATION SYSTEM AND METHOD

CROSS REFERENCE TO OTHER APPLICATIONS

This application is a continuation of co-pending U.S. patent application Ser. No. 12/006,376, entitled COMPUTER BASED GUEST MONITORING AND IDENTIFICATION SYSTEM AND METHOD filed Dec. 31, 2007 which is incorporated herein by reference for all purposes, which claims priority to U.S. Provisional Application No. 60/930,372, entitled COMPUTER BASED GUEST MONITORING AND IDENTIFICATION SYSTEM AND METHOD filed May 16, 2007 which is incorporated herein by reference for all purposes.

STATEMENT REGARDING FEDERALLY SPONSORED RESEARCH OR DEVELOPMENT

Not Applicable

REFERENCE TO A "MICROFICHE APPENDIX" (SEE 37 CFR 1.96)

Not Applicable

BACKGROUND OF THE INVENTION

1. Field of the Invention

The present invention relates to a guest monitoring and identification system and more particularly to a computer based guest monitoring and identification system comprising an identification device such as a radio frequency identification device adapted to be carried by a guest having programmed predetermined data identifying a guest. At least one activating signal transmitter is used to transmit an activating signal in a predetermined pattern over a designated area to be traversed by a guest having an identification device. A receiver receives transmitted data signal containing the programmed predetermined data identifying the guest. A guest identification and service information processor receives the transmitted data signal containing programmed predetermined data identifying a guest and communicates to a service staff display device the name and service profile for an identified guest.

2. Description of the Prior Art

Use of radio frequency identification devices (RFID), sometimes known as RFID tags, to identify a person or an object are well known in the prior art.

One example of a RFID system for identifying a person is disclosed in U.S. Pat. No. 6,937,154. U.S. Pat. No. 6,937,154 discloses a method and system for identifying an individual, accessing background information for an individual and updating such background information in various environments including retail environments and hospitality environments. The information is conveyed to a portable device. The disclosure in U.S. Pat. No. 6,937,154 is based on using an encoded RFID tag to identify the individual and to use the scanned data from the encoded RFID tag to access a database for information pertaining to that individual.

U.S. Pat. Nos. 6,873,260; 6,554,705 and 6,513,015 disclose systems for using RFID tag for allowing passage of individuals through a controlled area using a variety of identification techniques.

Published Patent Application US2002/016740 discloses an electronic shopping system and functions to present to a clerk a profile of the retail shopper along with identifying data.

In the prior art systems, the RFID or RFID tag are used to identify a user for retail shopping purposes or to identify a person for controlling access to a controlled area. None of the systems are related to the hospitality field where customers or guests referred to as very important persons ("VIP") are targeted, identified and given a preference over other customers and guests who are not targeted as a VIP.

Published Patent Application US2006/0109083 discloses a apparatus and method using RFID tags in the hospitality field and the apparatus and method use an RFID tag for identifying a person of interest inside a facility as opposed to identifying and providing a VIP access to a facility. In Published Patent Application US2006/0109083, the concept is based on issuing RFID tags to a guest wherein the RFID tag has encoded information relating to a quest that is common to one or more quests. The RFID tags in a designated area are scanned looking for specific encoded data and quests having the data are identified during the scan.

None of the known prior art anticipates, discloses, teaches or suggests a computer based guest monitoring and identification system having a guest identification and service information processor for receiving transmitted data signal containing programmed predetermined data for identifying a guest, for interpreting the programmed predetermined data identifying a guest and generating data/information signals providing the name and service profile for an identified guest and for communicating to service staff serving a guest the name and service profile for an identified guest including an assigned priority rating to insure that the service staff provides the appropriate service to a identified guest.

BRIEF SUMMARY OF THE INVENTION

The present invention seeks to overcome the problems of the prior art by providing a computer based guest monitoring and identification system that uses an identification device adapted to be carried by a guest and including therein programmed predetermined data identifying a guest and wherein the identification device is responsive to an activating signal to generate and transmit a data signal containing the programmed predetermined data identifying the guest and that data is processed by a guest identification and service information processor for interpreting the programmed predetermined data identifying a guest and generating data/information signals providing the name and service profile for an identified guest. The service profile information for an identified guest including an assigned priority rating is communicated to the service staff to insure that the service staff provides the appropriate service to an identified guest.

In the present invention, this is accomplished by a computer based guest monitoring and identification system.

The computer based guest monitoring and identification system includes an identification device adapted to be carried by a guest and includes therein programmed predetermined data identifying a guest. The identification device is responsive to an activating signal to generate and transmit a data signal containing the programmed predetermined data identifying the guest. An activating signal transmitter transmits a monitoring signal in a predetermined pattern over a designated area to be traversed by a guest having an identification device. A receiver receives from the identification device a transmitted data signal containing the programmed predetermined data identifying the guest. A guest identification and service information processor receives from the receiver the transmitted data signal containing the programmed predetermined data identifying a guest. The processor includes a computer for interpreting the programmed predetermined data identifying a guest and to generate data/information signals providing the name and service profile for an identified guest. A service staff display device is operatively connected to the guest identification and service information processor for receiving therefrom the service profile information signal and for communicating to the service staff to be assigned to serve or serve the guest the name and service profile for an identified guest including an assigned priority rating to insure that the service staff provides the appropriate service to a identified guest.

The guest monitoring and identification system comprises an identification device including therein programmed predetermined data identifying a user. The identification device is responsive to an activating signal to generate and transmit a data signal containing the programmed predetermined data identifying the guest. At least one activating signal transmitter transmits a monitoring signal over a designated area to be traversed by a user having an identification device. At least one receiver receives from the identification device a transmitted data signal containing the programmed predetermined data identifying the user. A guest identification and service information processor receives from the receiver the transmitted data signal containing the programmed predetermined data identifying a user. The processor includes a computer for processing the programmed predetermined data identifying a user and generating data/information signals providing the name and information profile for an identified user based on user history. A communication device is operatively connected to the processor for receiving therefrom the service profile information signal and communicates the same to staff serving a user the name and service profile for an identified user.

A method for monitoring and identify a guest is disclosed and taught herein by the present invention. The method comprising the step of: preparing an identification device adapted to be carried by a guest and including therein programmed predetermined data identifying a guest wherein the identification device is responsive to an activating signal to generate and transmit a data signal containing the programmed predetermined data identifying a guest; transmitting an activating signal from a transmitter in a predetermined pattern and over an designated area to be traversed by a guest having an identification device; receiving with a receiver from the identification device a transmitted data signal containing the programmed predetermined data identifying the guest; processing with a guest identification and service information processor the transmitted data signal received from the receiver containing the programmed predetermined data identifying a guest wherein the processor includes a computer for interpreting the programmed predetermined data identifying a guest and generating data/information signals providing the name and service profile for an identified guest including an assigned priority rating based on guest history; and communicating to a service staff via a display device operatively connected to the processor guest identification and service information received from the processor the name and service profile for an identified guest including an assigned priority rating to insure that the service staff provides the appropriate service to an identified guest.

The known prior art does not anticipate, disclose, suggest or teach a computer based guest monitoring and identification system for generating a guest profile in the hospitality field including assignment of a priority code to identify the quest as a VIP and denoting personal preferences for the guest.

Therefore, it is an advantage of the present invention to provide a computer based guest monitoring and identification system responsive to an RFID tag, which may be passive device or an active device, for use in the hospitality field and for generating a guest profile including assignment of a priority code to identify the quest as a VIP and denoting personal preferences for the guest.

Another advantage to the present invention is that the guest monitoring and identification system uses an identification device adapted to be carried by a guest and includes therein programmed predetermined data identifying a guest. The identification device may be in the form of an active or passive RFID tag and is responsive to an activating signal to generate and transmit a data signal containing the programmed predetermined data identifying the guest.

Another advantage to the present invention is that the guest monitoring and identification system includes one or more activating signal transmitters for transmitting a monitoring signal in a predetermined pattern over a designated area to be traversed by a guest having an identification device. In the system, one or more entrances to a facility can be monitored and controlled and the host can be advised as to which entrance an identified VIP will enter the facility.

Another advantage to the present invention is that the guest monitoring and identification system includes at least one receiver for receiving from the identification device a transmitted data signal containing the programmed predetermined data identifying the guest.

Another advantage to the present invention is that the guest monitoring and identification system includes a guest identification and service information processor for receiving transmitted data signal containing the programmed predetermined data identifying a guest. The processor includes a computer for interpreting the programmed predetermined data identifying a guest and generating data/information signals providing the name and service profile for an identified guest.

Another advantage to the present invention is that the guest monitoring and identification system includes a service staff display device operatively connected to the guest identification and service information processor for receiving therefrom the service profile information signal and for communicating to service staff serving a guest the name and service profile for an identified guest including an assigned priority rating to insure that the service staff provides the appropriate service to a identified guest.

Another advantage to the present invention is that the guest monitoring and identification system includes a service staff display device operatively connected to the guest identification and service information processor for receiving therefrom the service profile information signal including the name and service profile for an identified guest and an assigned priority rating based on guest history in the service profile.

Another advantage to the present invention is that the guest identification and service information processor may include a look-up storage table to provide specific criteria for defining the service profile for an identified guest including an assigned priority code, historical spending patterns, personal preferences in food and beverages and seating assignment. The look-up storage table specific criteria may include credit card information.

Another advantage to the present invention is that the guest monitoring and identification system includes a data entry device operatively coupled to the processor to enable service staff to update data and information in the look-up storage table.

Another advantage to the present invention is that the guest monitoring and identification system processor is responsive to a transmitted data signal containing the programmed predetermined data identifying a guest to determine if a guest has a stored service profile and if so, to process the transmitted signal.

Another advantage to the present invention is that the guest monitoring and identification system processor is responsive to a transmitted data signal containing the programmed predetermined data identifying a guest to determine if a guest has a stored service profile and if not, to generate an information signal so advising service staff so that an appropriate identification device to be carried by a guest is required which needs to be programmed with programmed predetermined data identifying the guest.

Another advantage to the present invention is that the guest monitoring and identification system processor includes a guest database for all guests present at a facility and wherein the processor is responsive to a transmitted data signal containing the programmed predetermined data identifying a guest to generate from the guest database a listing of guests present concurrently at a facility with an identified guest which are preprogrammed into the service profile of an identified guest to enable service staff to communicate such information to an identified guest.

Another advantage to the present invention is that the guest monitoring and identification system includes at least one activating signal transmitter for transmitting a monitoring signal over an designated area to be traversed by a user having an identification device and at least one receiver for receiving from one or more RFID tags activated by the activating signal transmitter a transmitted data signal containing the programmed predetermined data identifying the user which is processed by a guest identification and service information processor. By using two or more activating signal transmitters for transmitting a monitoring signal over two or more designated areas to be traversed by a user, e.g. a driveway or walkway, the service staff or host can also be advised as to the location where the guest is expected to first appear.

Another advantage to the present invention is that the a method is disclosed and taught herein for monitoring and identifying a guest and communicating to a service staff, via a display device operatively connected to the processor, guest identification and service information received from the guest identification and service information processor including the name and service profile for an identified guest and an assigned priority rating to insure that the service staff provides the appropriate service to an identified guest.

Another advantage to the present invention is that a method is disclosed and taught herein for identifying a guest prior to the guest reaching any one of two or more entryways to a facility or prior to being greeted by a host at the facility.

BRIEF DESCRIPTION OF THE DRAWING

The present invention will become more fully understood from the following detailed description of a preferred but non-limiting embodiment thereof, described in connection with the accompanying drawings, wherein.

DETAILED DESCRIPTION OF THE INVENTION

Background

Figure 1:
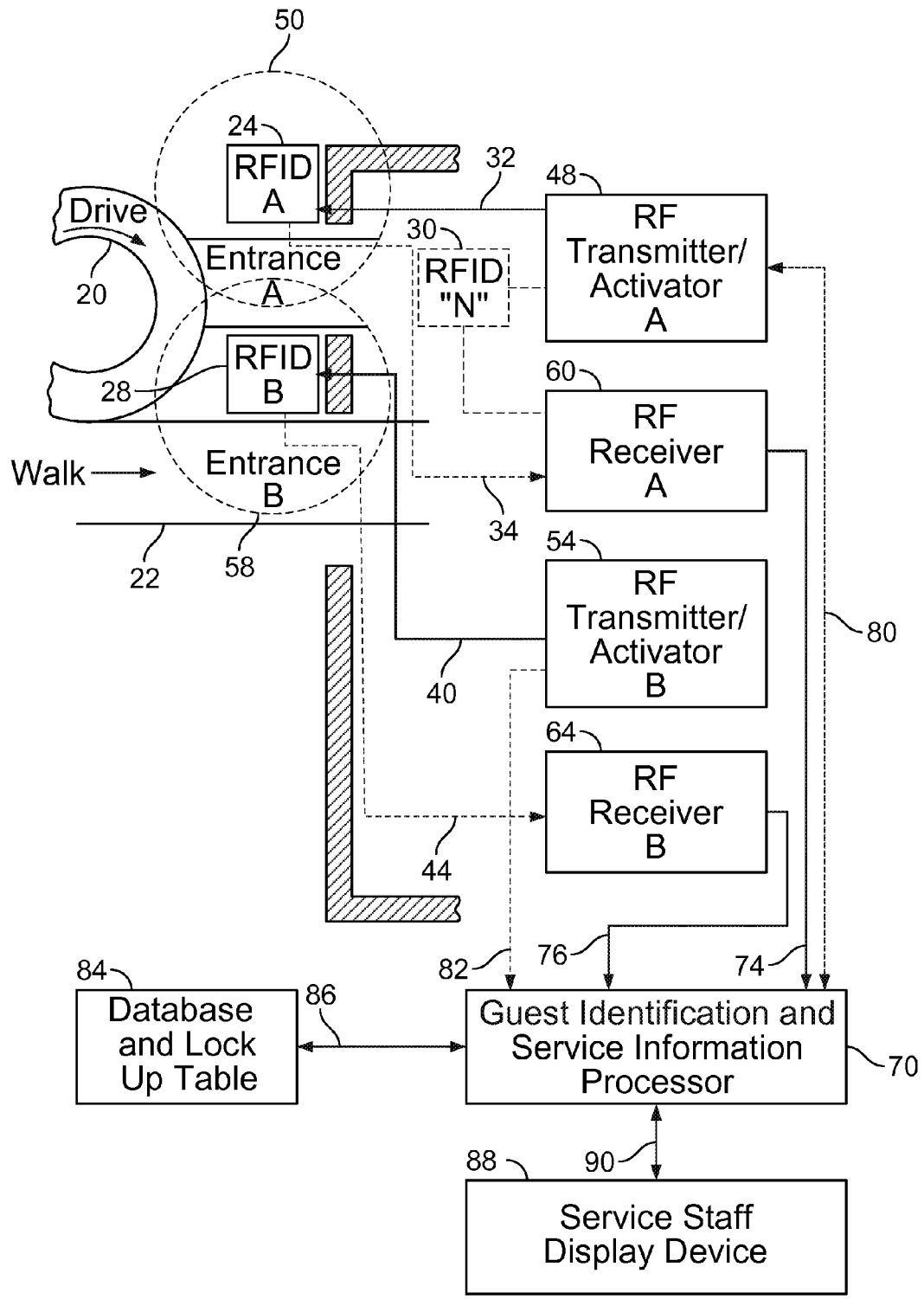
FIG. 1 is a block diagram showing the computer based guest monitoring and identification system for a facility having two entrances.

In the hospitality field, generally, and more particularly in the restaurant field, the goal is to enhance a guest's experience during and after the dining experience.

To that end, upscale restaurateurs have undertaken programs to develop customer loyalty while marketing the restaurant to the customer. The marketing efforts include encouraging the customers to use the restaurant's website and online reservation system where a customer's name, address, phone number and e-mail address are stored in a database. The so developed database may be used to send brochures, information and newsletters to or otherwise enable a restaurant to communicate with a customer over the internet.

This provides the restaurateur with the ability to make use of the customer database to establish a preferred guest program that includes tracking the dollars spent by a guest in the restaurant on a periodic basis, e.g., calendar quarterly basis. The database information can be use for a variety of purposes, such as for example, to establish gift certificate programs, or to target specific customers for or to invite identified customers to special events such as wine tasting or the like.

As a result of the above practices, the need for efficiently capturing, using and managing customer information to effectively manage a facility in the hospitality field generally, and more specifically in the restaurant field through use of software and computer systems has become very competitive.

One need that was identified in the hospitality field, generally, was the unfilled requirement that VIP guests or guests be identified as they approached the facility and that the computer system generates data/information signals providing the name and service profile for an identified guest and that the service profile information be communicated using a service staff display device to the service staff or host serving a guest including the name and service profile for an identified guest including an assigned priority rating to insure that the service staff provides the appropriate service to a identified guest.

One embodiment of a system and method of the present invention has application for use in upscale nightclubs, such as New York disco clubs, that cater to highly visible and well known VIP guests.

The teachings of the present invention enable an upscale club to identify a VIP guest as the VIP guest approaches the facility towards an entrance or to any one of two or more entrances to a facility and prior to encountering a host enabling the service staff to be immediately advised as the identify and profile of the VIP guest by the time that guest reaches the entryway to the facility or host. The service staff is then provided with a guest profile enabling the service staff to knowledgeably and properly greet the VIP guest. This capability provides the user of this invention with a significant competitive advantage over competing clubs in terms of providing individualized services for designated guests.

Concurrently, with the development of customer databases, it is also necessary that the so established databases store and process data and information of customers and guests so as to comply with the established privacy law designed to protect customers and customer data. To that end, data may be encrypted, data may be transferred over encrypted connections, e.g., https, data may stored on a locked server or in a locked server room and the database itself maybe encrypted and password protected. Such systems require the use of sophisticated computer systems, processors and software programming.

Guest Monitoring and Identification System and Method

As a result of the above described need, a guest monitoring and identification system has been developed together with a method for using the system.

A block diagram showing a computer based guest monitoring and identification system for a facility having two entrances, Entrance A and Entrance B, is shown in FIG. 1.

In FIG. 1, a computer based guest monitoring and identification system is installed in a facility having Entrance A from a driveway 20 and Entrance B from a walkway 22. A quest arriving by car on driveway 20 has been provided with a radio frequency identification device ("RFID") and this is captioned RFID A and identified by numeral 24. A second quest arriving by using the walkway 22 has been provided with a radio frequency identification device ("RFID") and this is captioned RFID B and identified by numeral 28.

In the preferred embodiment, the identification device adapted to be carried by a guest is a passive RFID device. A passive RFID device is a device that responds to an interrogation by a radio frequency signal, at a predetermined frequency, to generate and transmit to a receiver a programmed predetermined data identifying a guest.

One example of a predetermined frequency for the interrogating radio frequency signal is wireless technology using the internet standard 802.11b that operates in the 2.4 giga hertz ("GHz") band having a nominal processing rate of 11 mega bits per second ("Mbps"). Other internet standards and/or frequencies known to persons skilled in the art could be used for the interrogating radio frequency signal.

It is also envisioned that an active RFID device could be used containing an energy source, e.g. a battery, and processor which is responsive to an activating signal or interrogating radio frequency signal for transmitting programmed predetermined data as a radio frequency signal received by a receiver.

The RFID A 24 from the driveway 20, and an RFID tag "N" which represents any guest having an RFID tag and shown by dashed box, is responsive to an activating signal 32 to generate and transmit a data signal containing the programmed predetermined data identifying the guest as depicted by dashed line 34.

The RFID B 28 from the walkway 22 is responsive to an activating signal 40 to generate and transmit a data signal containing the programmed predetermined data identifying the guest as depicted by dashed line 44.

A first activating radio frequency ("RF") signal transmitter/activator A identified as element 48 transmits an activating signal or interrogation signal or a monitoring signal 32 in a predetermined pattern over a designated area shown by dashed circle 50 to be traversed by a guest having an identification device designated by RFID A 24.

A second activating radio frequency ("RF") signal transmitter/activator B identified as element 54 transmits an activating signal or interrogation signal or a monitoring signal 40 in a predetermined pattern over an designated area shown by dashed circle 58 to be traversed by a guest having an identification device designated by RFID B 28.

A first RF receiver A identified as element 60 receives from the identification device RFID A 24 a transmitted data signal containing the programmed predetermined data identifying the guest as depicted by dashed line 34.

A second RF receiver B identified as element 64 receives from the identification device RFID B 28 a transmitted data signal containing the programmed predetermined data identifying the guest as depicted by dashed line 44.

A guest identification and service information processor 70 receives from the RF receiver A 60 via channel 74 and from the RF receiver B 64 via channel 76 the transmitted data signals containing the programmed predetermined data identifying a guest. The guest identification and service information processor 70 is operatively coupled to the RF transmitter/activator A 48 via a channel depicted as dashed line 80 and to the RF transmitter/activator B 54 via channel depicted as dashed line 82 to enable the guest identification and service information processor 70 to control the monitoring and interrogation of RE transmitter/activator 48 and RF transmitter/activator 54.

By using two or more activating signal RF transmitters/activators such as RF transmitter/activator A 48 and RF transmitter/activator B 54 for transmitting a monitoring signal over two or more designated areas to be traversed by a user, e.g. a driveway 20 or walkway 22, the service staff can also be advised as to the location where the guest is expected to first appear.

Figure 2:
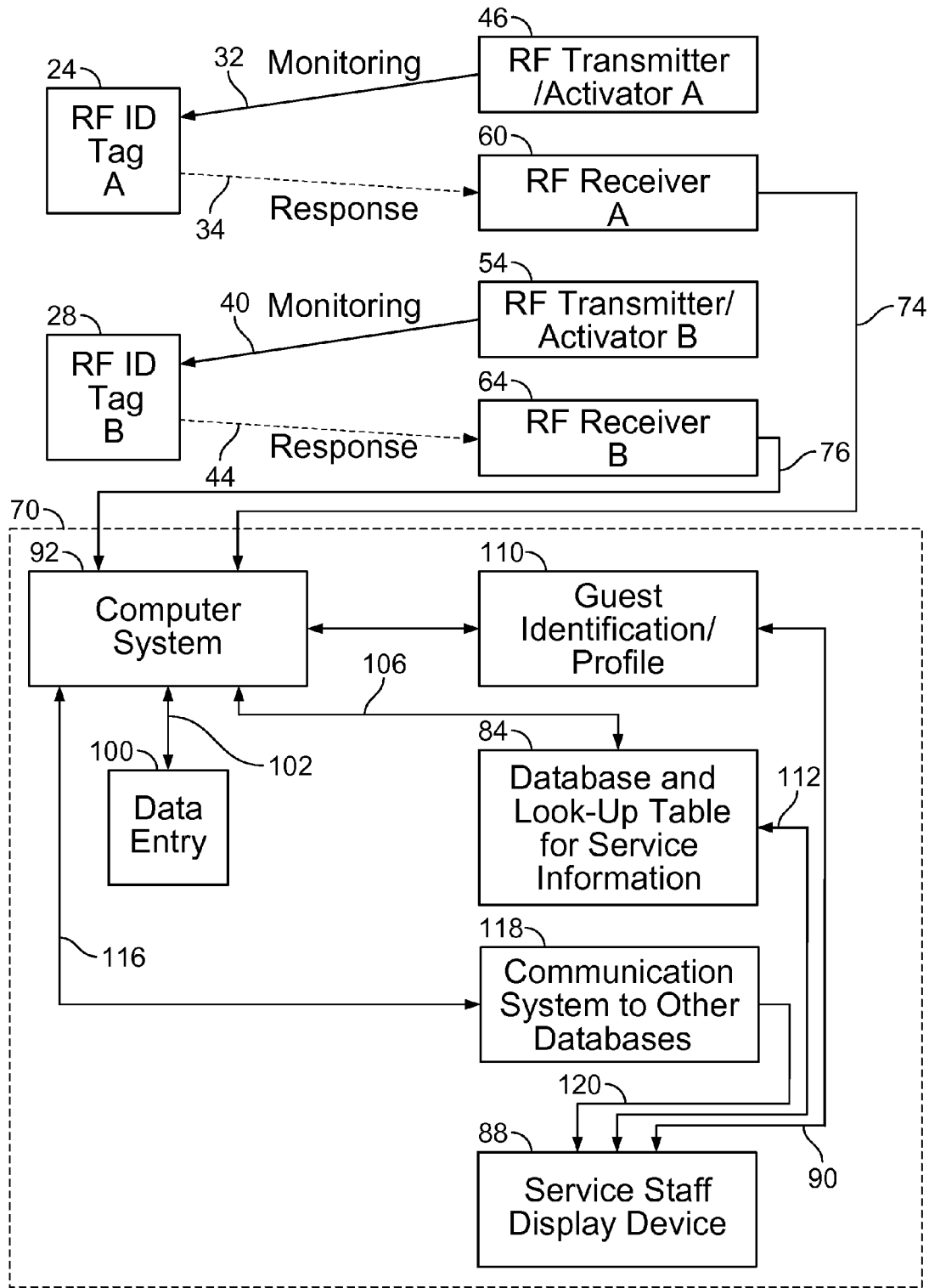
FIG. 2 is a block diagram showing the guest monitoring and identification processor, computer system and service staff display device.

The guest identification and service information processor 70 includes a computer system, depicted as 92 in FIG. 2, which is operatively coupled to a database and look-up table as shown by element 84 shown in FIG. 1 and FIG. 2. The database and look-up table of element 84 contains the current data/information providing the name and service profile for an identified guest.

The computer 92 of the guest identification and service information processor 70 interprets or decodes, as the case may be, the programmed predetermined data identifying a guest and communicates via channel 86 with the database and look-up table of element 84 containing the current data/information providing the name and service profile for an identified guest. The guest identification and service information processor 70 then generates data/information signals providing the name and service profile for an identified guest and transmits the same to a service staff display device 88 via channel 90. The service staff display device communicates to service staff serving a guest the name and service profile for an identified guest including an assigned priority rating to insure that the service staff provides the appropriate service to a identified guest.

The block diagram of FIG. 2 shows the guest monitoring and identification processor 70 as a dashed box, the computer system 92 and the service staff display device 88. The computer system 92 is operatively coupled to a data entry device 100 via line 192. The data entry device 100 can be used by the service staff to access the database and look-up table 84 and to update the same via line 106.

The computer system 92 generates data/information signals providing the guest identification/profile as depicted by element 110 and transmits the same to a service staff display device 88 via channel 90. The service staff can locally access the database and look-up table 84 via line 112 or access the computer system 92 via line 120, the communication system 118 to the computer system 92 via line 116.

Other databases may be accessed by the computer system 92 or by the service staff via the service staff display device 86. The computer system 92 can communicated with the other databases via communication device 118 as shown by line 116. Examples of other databases include local databases, central databases, the worldwide web or internet. For example, a guest may make a reservation over the internet and the reservation will appear in a database accessible by the computer system 92 and displayed on the service staff display device 88.

Figure 3:
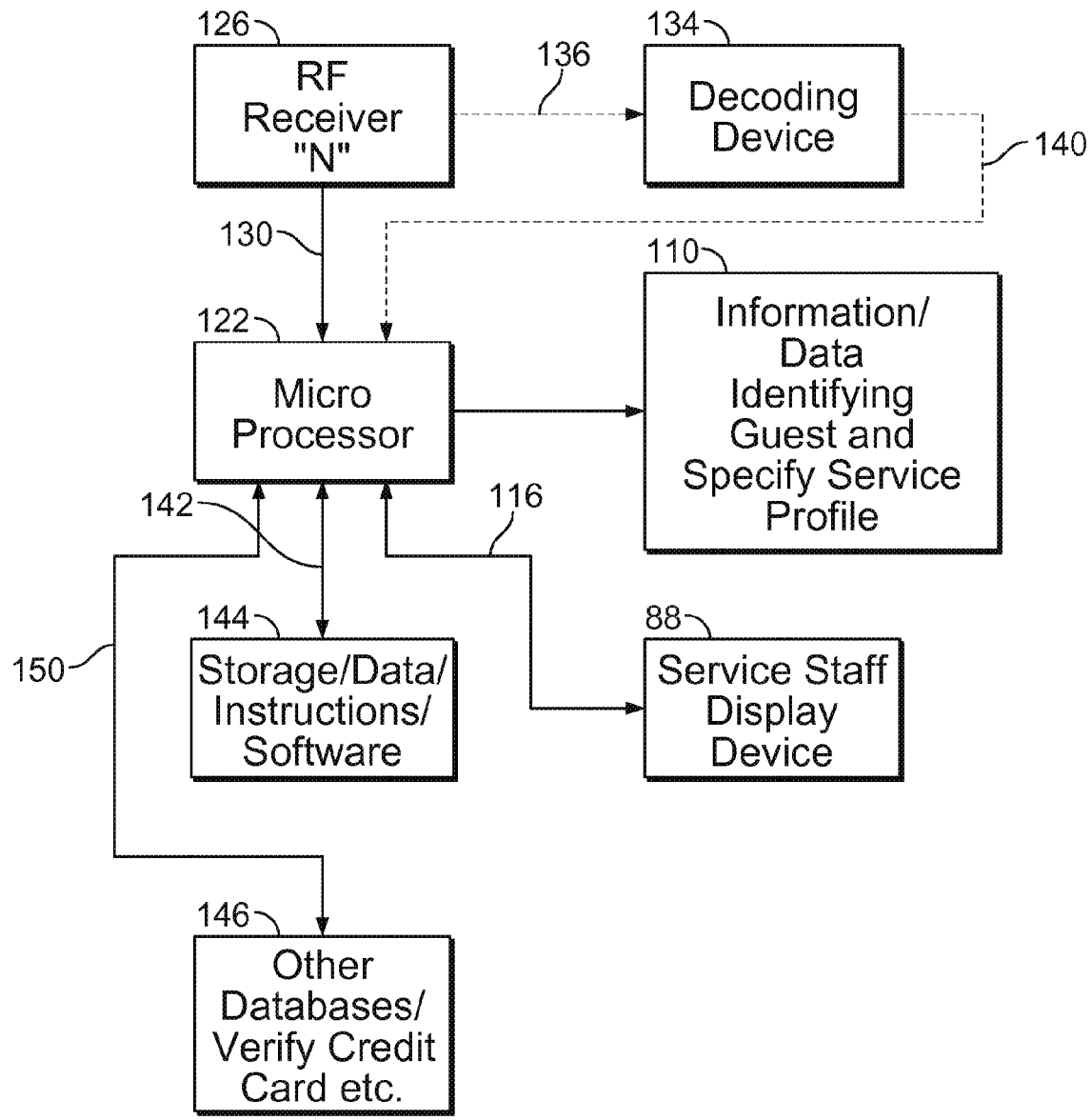
FIG. 3 is a block diagram showing the guest identification and service information processor including a microcomputer for interpreting the programmed predetermined data identifying a guest and generating data/information signals providing the name and service profile for an identified guest and communicating the data/information signals to a service staff display device.

In FIG. 3, the block diagram shows an RF receiver "N" identified as element 126, which represents the identification device RFID "N" 30 shown in FIG. 1, a transmitted data signal containing the programmed predetermined data identifying the guest, as depicted by dashed line 34 in FIG. 1. The RF receiver "N" 126 applies the transmitted data signal containing the programmed predetermined data identifying the guest to a microprocessor 122 via channel 130.

If the transmitted data signal containing the programmed predetermined data identifying the guest is an encoded signal or encrypted signal, the encoded signal or encrypted signal is applied to a decoding device depicted as dashed box 134 via line 136, depicted as dashed line, for decoding or encrypting. The decoded signal or de-encrypted signal, as the case may be, is applied to the microprocessor 122 via line 140, which is depicted as a dashed line, for processing.

The microprocessor 122 has resident storage/data/instructions and software depicted by element 144 and which communicates with the microprocessor 122 via channel 142 which controls the operations of the microprocessor 122, specifically, and the guest identification and service information processor 70, generally. The microprocessor 122 communicates with other databases 146 via line 150. The microprocessor 122 interprets the programmed predetermined data identifying a guest and generates data/information signals providing the name and service profile for an identified guest as depicted by element 110 and communicates the data/information signals to a service staff display device 88 via line 116.

The service staff, upon receiving the guest identification information and service profile from the service staff display device 88, then provides the appropriate service to the identified guest based upon the name, service profile for an identified guest and an assigned priority rating based on guest history as shown in the service profile.

The look-up tables, as shown by element 84 in FIG. 1 and FIG. 2, includes specific criteria for defining the service profile for an identified guest. The specific criteria defining the service profile for an identified guest may include an assigned priority code, historical spending patterns, personal preferences in food and beverages, seating assignment and credit card information.

The computer based guest monitoring and identification system 70 may be responsive to a transmitted data signal containing the programmed predetermined data identifying a guest to determine data if a guest has a stored service profile and, if so, to process the transmitted signal.

On the other hand, the computer based guest monitoring and identification system 70 shown in FIG. 1 and FIG. 2 may be responsive to a transmitted data signal from some other type of RFID tag, e.g., another RFID in the possession of the guest, such data signal does not contain the specific programmed predetermined data required the computer based guest monitoring and identification system 70 which, in turn, generates an information signal so advising service staff so that an appropriate identification device or RFID tag can be provided to a guest which is programmed with appropriate programmed predetermined data identifying the guest.

The computer based guest monitoring and identification system 70 may include a processor having a database for monitoring all guests present at a facility using an RF transmitter/activator wherein the processor is responsive to a all transmitted data signals containing the programmed predetermined data identifying a guest to generate from the guest database a listing of guests concurrently present at a facility with an identified guest which are preprogrammed into the service profile of an identified guest to enable service staff to communicate such information to an identified guest.

Figure 4A:
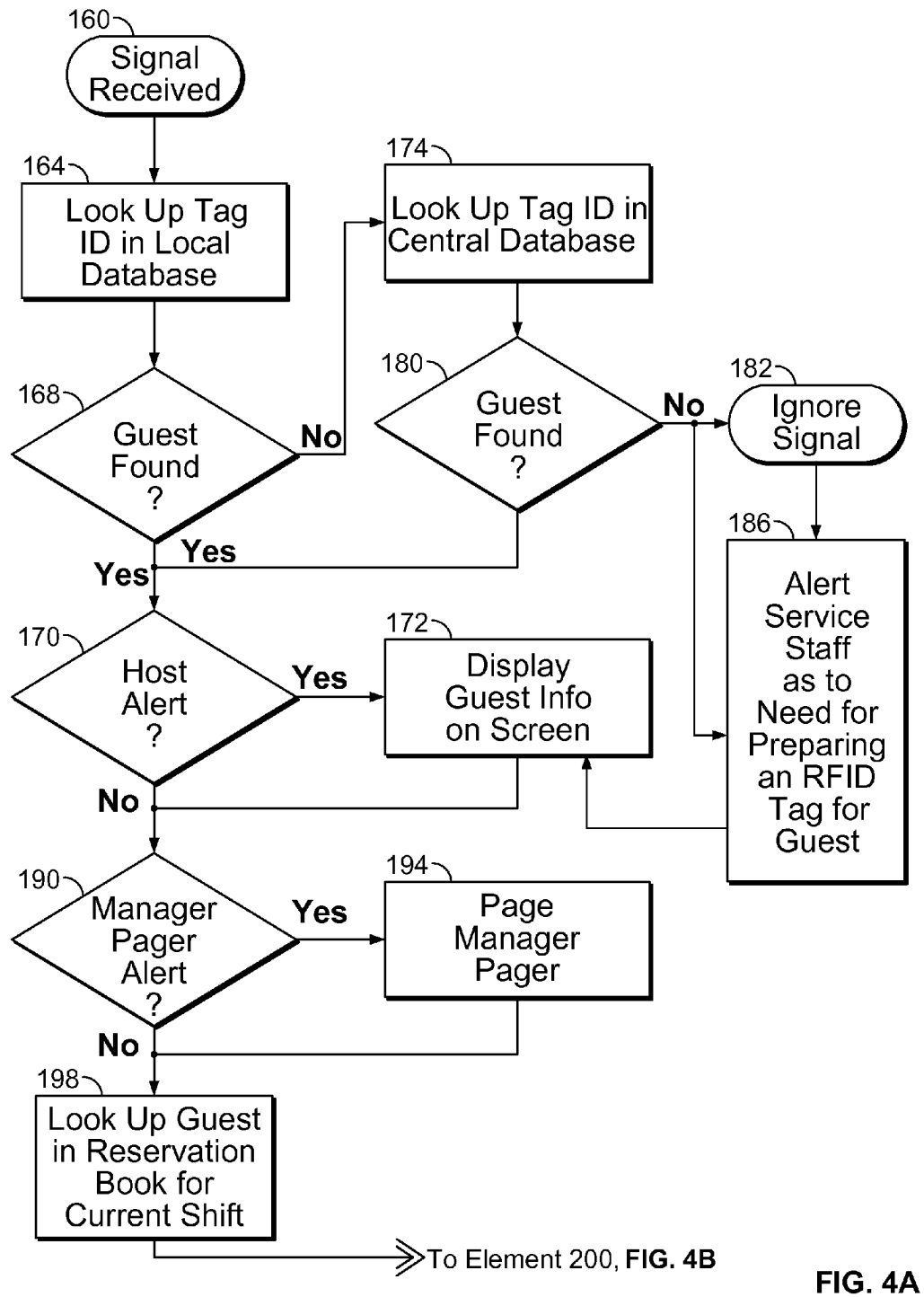
FIGS. 4A and 4B together comprise a software flow diagram for the guest monitoring and identification system, the guest identification and service information processor and service staff display device.
Figure 4B:
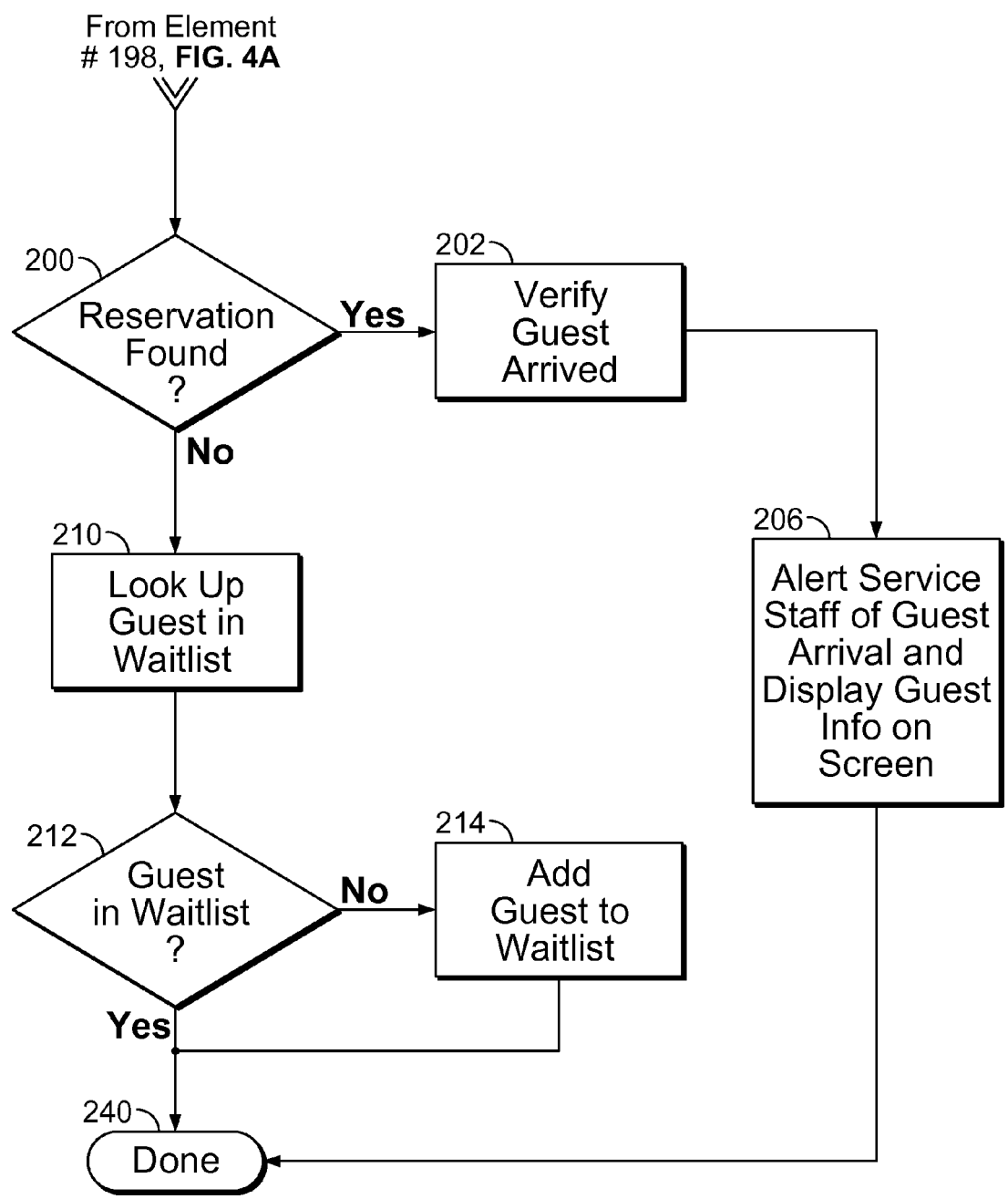

FIGS. 4A and 4B together comprise a software flow diagram for the guest monitoring and identification system, the guest identification and service information processor and service staff display device.

When a transmitted data signal containing the programmed predetermined data identifying the guest is received from an RF receiver as depicted by element 160, the computer system looks up RFID tag in the local database as depicted by box 164. The computer then determines if the guest has been found the local database as depicted by element 168.

If the guest is found in the local database, then the service staff or host is alerted as depicted by element 170 and the name and service profile of the guest is communicated to the service staff by a communication device or service staff display device as depicted by element 172.

If the guest is not found in the local database, then the computer system looks up the RFID tag in a central database as depicted by box 174. If the guest is not found in the central database as depicted by element 180, then the computer system may either ignore the signal as depicted by element 182 or alert the service staff as to the need for preparing an RFID tag for the guest which includes assigning a programmed predetermined data identifying a guest as depicted by element 186.

If the guest is found in the local database or central database, then the service staff is alerted by a communication device or service staff display device as depicted by element 172, along with the name and service profile of the guest.

If the service staff or host is alerted as depicted by element 170 and the name and service profile of the guest is communicated to the service staff as depicted by element 172. Depending on the importance of the guest, e.g. an important VIP, a decision is made whether to alert the manager as depicted by element 190. If the decision is made to alert the manager, then a page is sent to the manger as depicted by element 194. If the decision is made to not alert the manager, then the processing of the guest information proceeds without intervention of the manager.

The system then looks up the name of the guest in the reservation book for the current shift as depicted by element 198 in FIG. 4A and a determination is made if the guest has a reservation. If the reservation is found as depicted by element 200 in FIG. 4B and the system denotes or verifies that the guest has arrived as depicted by element 202 and alerts the service staff of the same as depicted by element 206. The service staff having been advised of the arrival of the guest, the name of the guest and the service profile is then displayed on the screen of the service staff display device as depicted by element 206. Then the system is done as depicted by element 240.

If the determination is made that the guest does not have a reservation for the current shift, then the system looks up the name of the guest in the waitlist as depicted by element 210 and a determination is made if the guest is on the waitlist as depicted by element 212. If the guest is not on the waitlist, the guest is added to the waitlist as depicted by element as depicted by element 214.

The system then denotes that the guest has arrived, is on the waitlist and alerts the service staff of the same. The guest is ten served when space is available. The service profile is displayed on the screen of the service staff display device in the same manner as depicted by element 206. Then the system is done as depicted by element 240.

The teachings of this invention related to a system for monitoring and identifying guests for a business entity. The system comprises an identification device, e.g. an RFID "N" tag 30 of FIG. 1, which includes therein programmed predetermined data identifying a user or guest. The identification device is responsive to an activating signal, e.g. RFID transmitter/activator 46 of FIG. 1, to generate and transmit a data signal containing the programmed predetermined data identifying the guest.

At least one activating signal transmitter, e.g. RFID A 46 of FIG. 1, transmitting a monitoring signal over a designated area to be traversed by a user having an identification device, e.g. predetermined area 50 shown in FIG. 1.

At least one receiver, e.g. RF receiver B 60 of FIG. 1, receives from the identification device a transmitted data signal containing the programmed predetermined data identifying the user.

A guest identification and service information processor, e.g. processor 70 as shown in FIG. 1, receives from the receiver the transmitted data signal containing the programmed predetermined data identifying a user. The processor includes a computer, e.g. computer system 92 in FIG. 2, for processing the programmed predetermined data identifying a user and generates data/information service profile signals providing the name and information profile for an identified user based on user history. A communication device, e.g. staff service display device 80 of FIG. 1, is operatively connected to the processor for receiving therefrom the data/information service profile signals and for communicating the staff serving the name and service profile for an identified user.

A method for monitoring and identify a guest is disclosed and taught by this invention. The method comprises the steps of: (a) preparing an identification device adapted to be carried by a guest and including therein programmed predetermined data identifying a guest, said identification device being responsive to an activating signal to generate and transmit a data signal containing the programmed predetermined data identifying a guest; (b) transmitting an activating signal from a transmitter in a predetermined pattern and over an designated area to be traversed by a guest having an identification device; (c) receiving with a receiver from said identification device a transmitted data signal containing the programmed predetermined data identifying the guest; (d) processing with a guest identification and service information processor said transmitted data signal received from said receiver containing the programmed predetermined data identifying a guest, said processor including a computer for interpreting the programmed predetermined data identifying a guest and generating data/information signals providing the name and service profile for an identified guest including an assigned priority rating based on guest history; and (e) communicating to a service staff via a display device operatively connected to said processor guest identification and service information received from said processor the name and service profile for an identified guest including an assigned priority rating to insure that the service staff provides the appropriate service to an identified guest.

The above method the step of processing may include the computer interpreting the programmed predetermined data identifying a guest and generating data/information signals and providing the name and service profile for an identified guest and an assigned priority rating based on guest history in the service profile.

The above method the step of processing may include a computer and further comprise a look-up storage table operatively connected to the processor to provide specific criteria for defining the service profile for an identified guest.

The above method the step of processing may include a computer and further comprise a look-up storage table operatively connected to the processor to provide specific criteria for defining the service profile for an identified guest including an assigned priority code, historical spending patterns, personal preferences in food and beverages and seating assignment.

The above method the step of processing may include a computer and further comprise the computer having a look-up storage table for providing credit card information.

The above method the step of processing may include a computer and further comprises the computer comprising a data entry device operatively coupled to the processor to enable service staff to update data and information in the look-up storage table.

The above method the step of processing may include a computer and further comprise the computer being responsive to a transmitted data signal containing the programmed predetermined data identifying a guest to determine data if a guest has a stored service profile and if so, to process the transmitted signal.

The above method the step of processing may include a computer and further comprise the computer being responsive to a transmitted data signal from some type of RFID tag that does not contain the specific programmed predetermined data as required the computer based guest monitoring and identification system by generating an information signal so advising service staff so that an appropriate identification device or RFID tag can be provided to a guest which is programmed with appropriate programmed predetermined data identifying the guest.

The above method the step of processing may include a computer having a guest database for all guests present at a facility at the same time as an identified guest and wherein the processor is responsive to a transmitted data signal containing the programmed predetermined data identifying a guest to generate from the guest database a listing of guests concurrently present at a facility with an identified guest which are preprogrammed into the service profile of an identified guest to enable service staff to communicate such information to an identified guest.

The above method the step of processing may include the step of transmitting including at least two RF transmitters/ activators covering two or more designated area and further comprising the steps of transmitting with two or more activating signal transmitters a monitoring signal over two or more designated areas to be traversed by a user; determining the location where the guest is expected to first appear; and alerting the service staff as to the location where the guest is expected to first appear.

It is envisioned that the computer based guest monitoring and identifying system and method can be used in other fields, such as, without limitation, restaurants, retail and other commercial fields in substantially the preferred embodiment or variation thereof. It will be appreciated that various alterations and modifications may be made to guest monitoring and identifying system and method to enhance the functional characteristics thereof. All such variations and modifications should be considered to fall within the scope of the invention as broadly hereinbefore described and as claimed hereafter.

All such uses, variations, modifications and the like are anticipated to be within the scope of this invention.

What is claimed is:

1. A system for identifying a guest, comprising
a local database including a first portion of data pertaining to all guests present at a restaurant;
a central database including a second portion of data pertaining to all guests present at the restaurant, the central database being separate from the local database; and
an input interface configured to:
  receive data identifying a guest from a device;
a processor configured to:
  look up the data identifying the guest in the local database;
  in response to a determination that the data identifying the guest is not found in the local database:
    look up the data identifying the guest in the central database;
    in response to a determination that the data identifying the guest is not found in the local database or the central database:
      output a message advising service staff, wherein the message comprises a message to provide an appropriate identification device to the guest with required data identifying the guest;
  in response to a determination that the data identifying the guest is found in the local database or the central database:
    indicating a name of the guest and a service profile of the guest using a service staff display device, the service profile including a priority level;
    determining whether the priority level is associated with a first priority level or a second priority level, the first priority level being different from the second priority level;
    instructing the service staff to perform a first action or a second action depending on whether the priority level is associated with the first priority level or the second priority level, respectively;
    determining using the local database or the central database whether the guest is in a reservation book for a current shift; and
    in response to a determination that the guest has a reservation, indicating that the guest has arrived to use the reservation in the reservation book.

2. The system as in claim 1, wherein the processor further comprises in response to a determination that the guest is not in the reservation book for the current shift, determining whether the guest is on a waitlist.

3. The system as in claim 2, wherein the processor further comprises in response to a determination that the guest is on the waitlist, indicating the name of the guest and the service profile of the guest using the service staff display device.

4. The system as in claim 1, wherein the processor further comprises in response to a determination that the guest is not in the reservation book for the current shift, adding the guest to a waitlist.

5. The system as in claim 4, wherein the processor further comprises indicating that the name of the guest is on the waitlist and indicating the service profile of the guest using the service staff display device.

6. The system as in claim 1, wherein an output interface is configured to provide a signal to the device requesting data identifying the guest.

7. The system as in claim 1, wherein the processor further comprises determining whether the guest is a VIP guest.

8. The system as in claim 7, wherein the processor further comprises determining that a manager is to be advised.

9. The system as in claim 8, wherein an output interface is configured to indicate to a manager display device that the guest is a VIP and a service profile of the VIP guest.

10. A method for identifying a guest comprising
receiving data identifying a guest from a device;
looking up, using a processor, the data identifying the guest in a local database, the local database including a first portion of data pertaining to all guests present at a restaurant;
in response to a determination that the data identifying the guest is not found in the local database;
  looking up the data identifying the guest in a central database, the central database including a second portion of data pertaining to all guests present at the restaurant, the central database being separate from the local database;
  in response to a determination that the data identifying the guest is not found in the local database or the central database:
    outputting a message advising service staff, wherein the message comprises a message to provide an appropriate identification device to the guest with required data identifying the guest;
in response to a determination that the data identifying the guest is found in the local database or the central database:
  indicating a name of the guest and a service profile of the guest using a service staff display device, the service profile including a priority level;
  determining whether the priority level is associated with a first priority level or a second priority level, the first priority level being different from the second priority level;
  instructing the service staff to perform a first action or a second action depending on whether the priority level is associated with the first priority level or the second priority level, respectively;
  determining using the local database or the central database whether the guest is in a reservation book for a current shift; and
  in response to a determination that the guest has a reservation, indicating that the guest has arrived to use the reservation in the reservation book.

11. The method as in claim 10, further comprising, in response to a determination that the guest is not in the reservation book for the current shift, determining whether the guest is on a waitlist.

12. The method as in claim 11, further comprising, in response to a determination that the guest is on the waitlist, indicating the name of the guest and the service profile of the guest using the service staff display device.

13. The method as in claim 10, further comprising, in response to a determination that the guest is not in the reservation book for the current shift, adding the guest to a waitlist.

14. The method as in claim 13, further comprising indicating that the name of the guest is on the waitlist and indicating the service profile of the guest using the service staff display device.

15. The method as in claim 10, further comprising indicating to provide a signal to the device requesting data identifying the guest.

16. The method as in claim 10, further comprising determining whether the guest is a VIP guest.

17. The method as in claim 16, further comprising determining that a manager is to be advised.

18. The method as in claim 17, further comprising indicating to a manager display device that the guest is a VIP and a service profile of the VIP guest.

19. A computer program product for identifying a guest, the computer program product being embodied in a non-transitory computer readable storage medium and comprising computer instructions for:
  receiving data identifying a guest from a device;
    looking up the data identifying the guest in a local database, the local database including a first portion of data pertaining to all guests present at a restaurant;
  in response to a determination that the data identifying the guest is not found in the local database;
    looking up the data identifying the guest in a central database, the central database including a second portion of data pertaining to all guests present at the restaurant, the central database being separate from the local database;
  in response to a determination that the data identifying the guest is not found in the local database or the central database:
    outputting a message advising service staff, wherein the message comprises a message to provide an appropriate identification device to the guest with required data identifying the guest;
  in response to a determination that the data identifying the guest is found in the local database or the central database:
    indicating a name of the guest and a service profile of the guest using a service staff display device, the service profile including a priority level;
    determining whether the priority level is associated with a first priority level or a second priority level, the first priority level being different from the second priority level;
    instructing the service staff to perform a first action or a second action depending on whether the priority level is associated with the first priority level or the second priority level, respectively;
    determining using the local database or the central database whether the guest is in a reservation book for a current shift; and
    in response to a determination that the guest has a reservation, indicating that the guest has arrived to use the reservation in the reservation book.

* * * * *